July 16, 1929.   F. N. CAMPBELL ET AL   1,720,883
APPARATUS FOR SEVERING GLASS OR THE LIKE
Filed Nov. 27, 1926   3 Sheets-Sheet 1
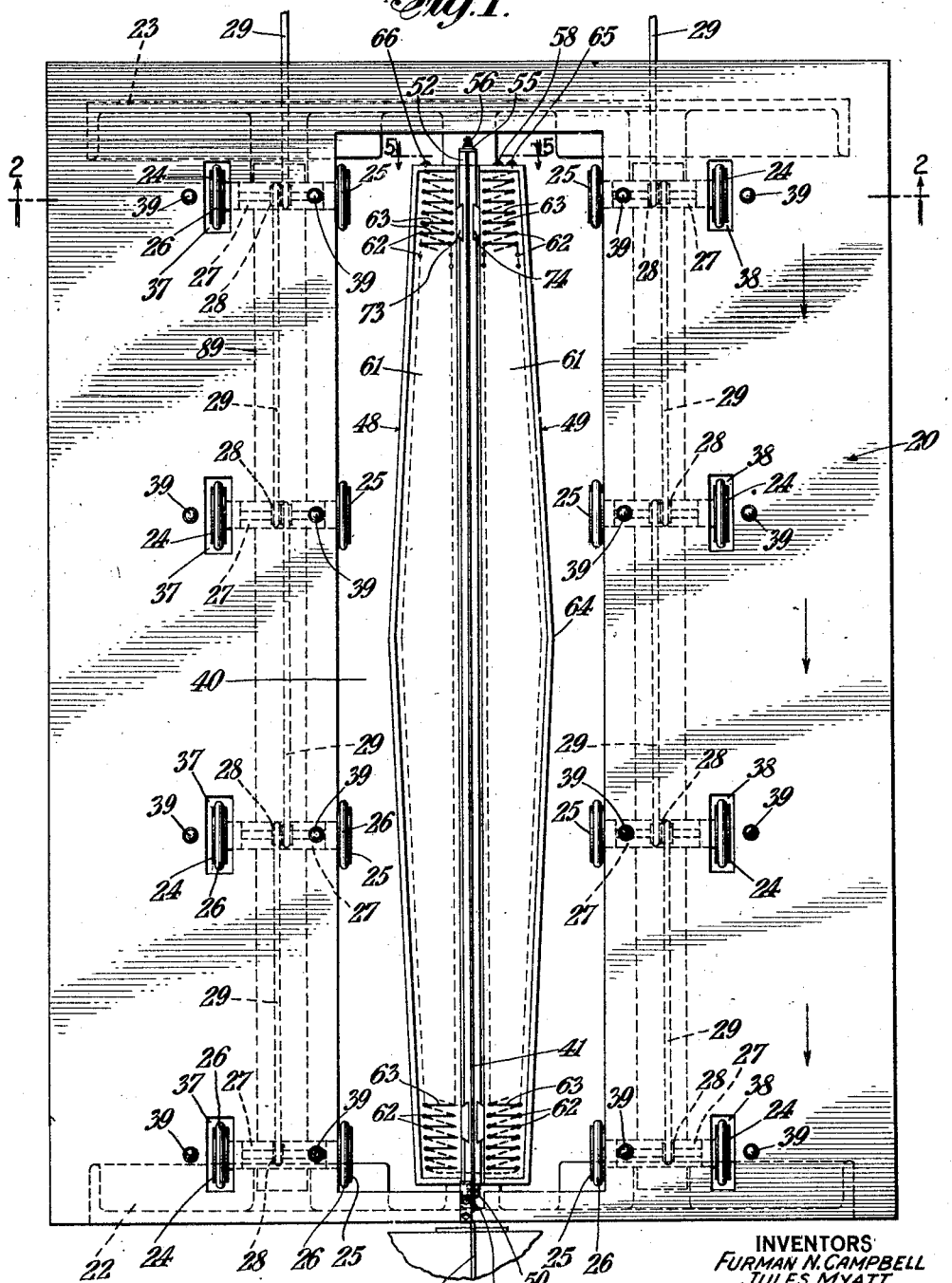
INVENTORS
FURMAN N. CAMPBELL
JULES MYATT
BY
Ward, Crosby & Smith
ATTORNEYS July 16, 1929.  F. N. CAMPBELL ET AL  1,720,883
APPARATUS FOR SEVERING GLASS OR THE LIKE
Filed Nov. 27, 1926  3 Sheets-Sheet 2
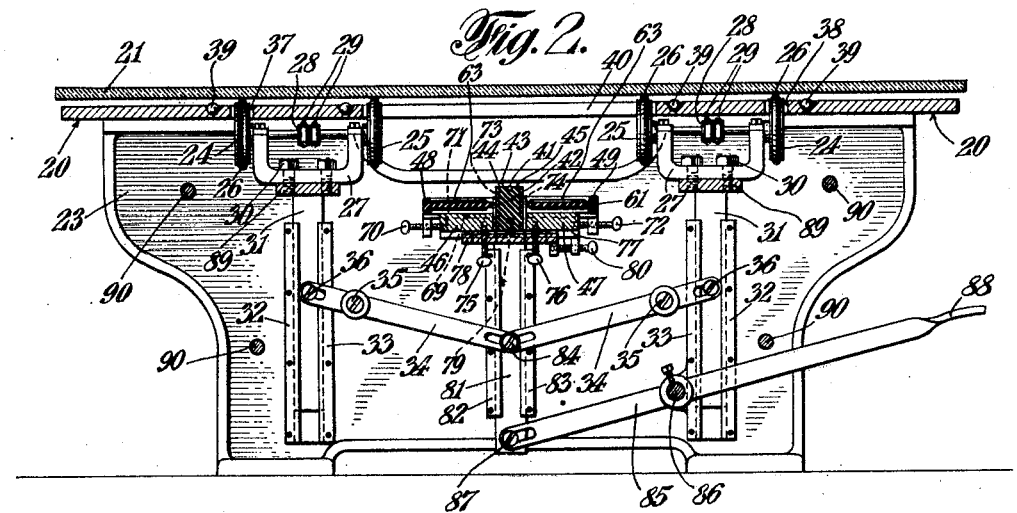
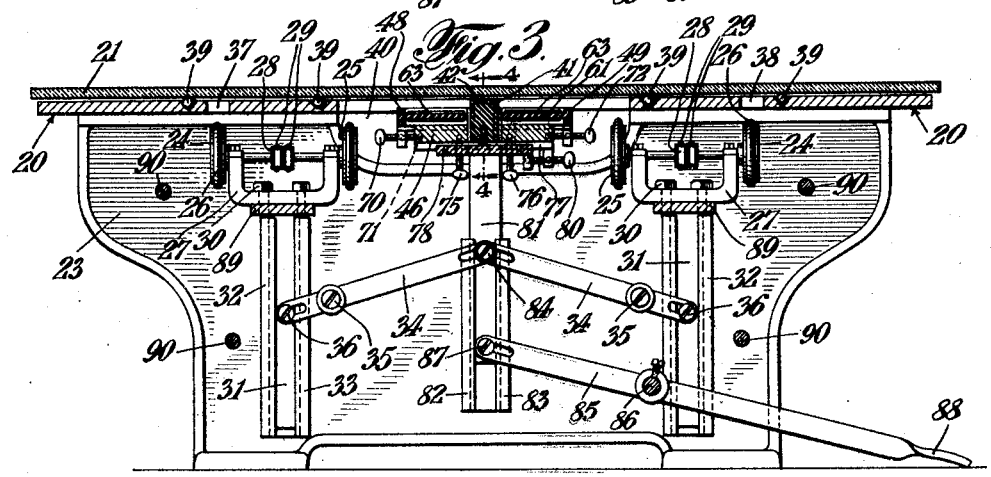
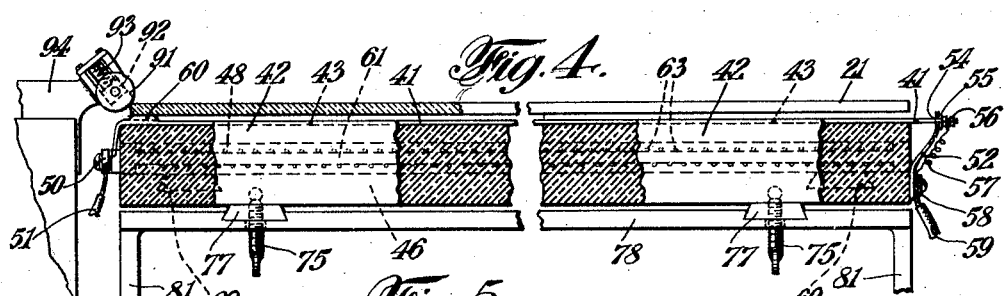
INVENTORS
FURMAN N. CAMPBELL
JULES MYATT
BY
Ward, Crosby & Smith
ATTORNEYS July 16, 1929.   F. N. CAMPBELL ET AL   1,720,883
APPARATUS FOR SEVERING GLASS OR THE LIKE
Filed Nov. 27, 1926   3 Sheets-Sheet 3

Inventors
FURMAN N. CAMPBELL
JULES MYATT
By their Attorneys
Ward, Crosby, & Smith Patented July 16, 1929.

1,720,883

UNITED STATES PATENT OFFICE.

FURMAN N. CAMPBELL, OF NEW HAVEN, AND JULES MYATT, OF EAST HAVEN, CONNECTICUT, ASSIGNORS TO BESSIE L. GREGG, OF FOREST HILL GARDENS, NEW YORK.

APPARATUS FOR SEVERING GLASS OR THE LIKE.

Application filed November 27, 1926. Serial No. 151,224.

This invention relates to apparatus for severing materials such as sheets of glass or the like.

We have in our present invention provided apparatus for severing glass along a defined line by applying heat to the zone of such line and controlling the distribution of such heat, and other conditions, in a manner whereby controlled expansion takes place and the glass is accurately severed at the desired line. We have found it satisfactory and convenient to apply such heat by bringing a hot object or objects or elements, heated electrically or otherwise, into contact with or into close proximity of the glass.

We have found it preferable to provide suitable means for supporting or suspending the glass, in a manner such as to permit unrestrained separation of the glass parts when being severed, the heat being applied along the desired line either along the under side or the upper side of the glass on the line of cleavage. In order to quickly initiate the severing action, a nick or fault or other weakened portion may be formed by the apparatus at a point on the glass at the line of cleavage where the severing action is to start.

The objects of this invention include the provision of dependable, relatively simple and convenient apparatus for the purposes above referred to. Further objects, features and advantages of the invention will more clearly appear from the detailed description given below taken in connection with the accompanying drawings which form a part of this specification.

In the drawings, Fig. 1 illustrates in plan view one form of glass severing machine embodying our invention;

Figs. 2 and 3 are sectional elevational views taken substantially along the line 2—2 of Fig. 1 and illustrating the parts of the machine in two different operating positions;

Fig. 4 is a sectional view taken substantially along the line 4—4 of Fig. 3;

Fig. 5 is a sectional view taken substantially along the line 5—5 of Fig. 1;

Figure 6:
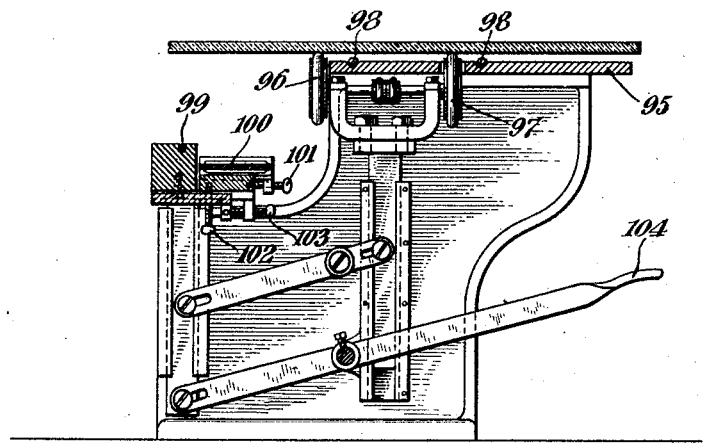
Fig. 6 is a sectional elevational view of another form of glass severing machine embodying our invention.

Referring to the drawings, a suitable supporting means such as a table is indicated at 20 upon which an extended area of glass as at 21 may be horizontally supported. The table may be provided at each end with supporting frames as at 22 and 23. The glass may be moved on to the table in proper position for cutting, either manually or automatically and to facilitate such handling a plurality of pairs of conveyor rollers as at 24 and 25 may be provided. As shown, the rollers may be provided with rubber peripheries as at 26 for contacting with the glass and may be mounted in pairs on suitable bearing yokes as at 27. If desired, the rollers may be driven from a suitable source of power, pulleys being provided as at 28 adapted to be rotated by suitable belts 29. With the machine shown, provision is made for cutting the glass along a line coinciding with the center portion of the machine, the conveyor rollers 24 and 25 being arranged at spaced points along each side of the zone of cutting. The yoke 27 of each pair of conveyor rollers may be secured as by bolts 30 to a member 31, which in turn is vertically slidable along the table supporting end frame between suitable guide members as at 32 and 33.

The conveyor rollers, together with the yokes 27 and slidable members 31, are movable vertically by the operation of lever members as at 34 pivotally mounted as at 35 upon the table end frame members and having pivotal and slidable engagement as at 36 with the members 31. The mechanism for operating the levers 34 will be hereinafter described. The table 20 may have suitable apertures as at 37 and 38 to permit the up and down movement of the conveyor rollers. When an area of glass is to be moved on to the supporting table, the conveyor rollers are normally in their elevated positions for contact with the glass. However, after the glass is in the desired position for cutting, the conveyor rollers may be lowered out of contact with the glass, thus bringing the glass into contact with a plurality of spaced anti-friction supporting devices as at 39. These anti-friction devices have been found desirable for the purpose of permitting unrestrained separation of the glass parts when being severed and may take the form either of rounded metallic surfaces over which the glass slides easily or may be in the form of rotatable balls positioned at spaced points along the table top.

The table top may be formed with a gap 40 of extended area beneath which means may be mounted for applying and controlling the heat for effecting the severing operation. An electrically heated element or object such as a length of nichrome wire or a metallic resistance member 41 may be mounted on a strip of insulation material 42 which is formed with a groove 43 for receiving the wire along the middle of its upper edge. At each side of the groove, shoulders 44 and 45 are provided on the insulation strip for assisting in the support of the severed edges of the glass and for preventing excessive sagging thereof during the severing operation. Such shoulder portions are of particular value for supporting narrow strips of glass which do not fully extend over the table. At its lower edge the strip of insulation 42 extends between a pair of shoulder members 46 and 47 for respectively supporting heating plates 48 and 49 as hereinafter more fully described.

The heated wire 41 as indicated in Fig. 4 may be secured at one end to a binding post 50 and connected with a lead 51 for extending to a current source. At its other end the wire may be secured to a spring member 52 for holding the wire straight and under tension when heated. The spring member 52 may be mounted on the strip of insulation 42 and secured by suitable clamping means 53 (see Fig. 5). The spring member 52 may be formed with a suitable aperture 54 for receiving a heat insulating bushing such as a glass bead 55 through which the wire 41 is threaded. At its end the wire 41 may be provided with suitable clamping means 56 electrically connected by the wire 57 to a binding screw and terminal 58. A lead wire 59 is provided for cooperating with the lead wire 51 in conducting the desired electrical power to the wire 41. The insulation bushing 55 protects and separates from the hot wire the tempered spring member 52.

In the particular example of the apparatus shown in Fig. 4, the hot wire 41 as received in the groove 43, although brought into close proximity of the under side of the glass, is retained throughout the greater portion of its length in a position spaced slightly from contact with the glass. However, at least at one point, preferably at its end, the wire 41 may be so positioned or formed with an enlargement as at 60 for contacting directly with the glass at a point near where it is desired to initiate the severing action, the remainder of the wire extending along near and directly beneath the desired line of cleavage. Our observations have indicated that under some circumstances, particularly where the surface of the glass is somewhat irregular, the heating of the glass along the line of cleavage may be made more uniform by thus spacing the wire slightly from the glass, although such spacing is not essential in all instances.

The heating plates 48 and 49 are preferably adjustably mounted to be separately movable and also movable with the heated wire 41 so that such plates may be brought into a desired spaced relation with the glass along the line of cleavage. Each of the heating plates may comprise a sheet of insulating material as at 61 (see Fig. 1) perforated as at 62 in order to receive an electrical resistance wire 63 threaded through the perforations. In the example shown in Fig. 1, the perforations are so spaced that at the upper side of the heating plates, strands of the heated resistance wire will extend in closely spaced relation along lines substantially perpendicular to the hot wire 41, which arrangement has been found to give highly satisfactory results. Along the center of the machine as at 64 the heating plates are shown as being substantially wider than at the ends of the machine, the width gradually tapering toward each end. At the edges of the glass it is under some circumstances apparently necessary to apply less heat than is necessary at the center portions of an extended area of glass to properly control the expansion of the glass along the cutting line, and accordingly the tapered shape of the heating plates has been found to satisfactorily fulfill such requirements. The resistance wires of the two heating plates may be connected in series if desired with the terminals attached to binding screws as at 65 and 66 (see Fig. 5) for engagement respectively with lead wires 67 and 68 extending to any suitable source of electrical current.

To provide for the desired lateral adjustment of the heating plate 48, the heating plate member and the shoulder portion 46 may be formed with cooperating guideways as 69 by which the heating plate 48 is secured to its shoulder portion 46 but is horizontally slidable in respect thereto. The heating plate may be adjusted and fixed in the desired position by turning a thumb screw 70 rotatably secured at 71 to the shoulder portion 46. The heating plate 49 may be mounted in a manner similar to heating plate 48 and provided with an adjusting thumb screw 72. In order to provide for movement of the heating plates 48 and 49 vertically in respect to the heating wire 41, the shoulder members 46 and 47 and the insulating strip 42 may be formed with cooperating slidable guide portions as at 73 and 74. The elevation of the shoulder portions 46 and 47 may be adjusted by means of thumb screws 75 and 76 which are in threaded engagement with a carriage member 77. The carriage member 77 in turn is slidable laterally in respect to a supporting member 78 whereby both heating plates 48 and 49, together with the heating wire 41, may be moved laterally in respect to the glass. The insulation strip 42 may be secured to the carriage member 77 by suitable screws as at 79. The lateral position of the carriage member 77 may be adjusted and affixed by a thumb screw as at 80. It will be understood that the supporting member 78 is formed with appropriate slots as indicated by dotted lines permitting free lateral movement of the thumb screws 75 and 76.

The relative arrangement and dimensions of the wire 41 and the heating plates 48 and 49 and parts thereof will depend to a certain extent upon the character and thickness of the glass or other material which is to be severed. For example, in some instances it may be found desirable to mount the heating plates in a position where they will come into a closer relationship with the glass than is indicated in the drawings in order to heat a limited area to a higher temperature. In other cases a more extended area may be heated by moving the plates to a position further away from the glass or further away from the wire 41. The extent of the heating may be further adjusted or varied by adjusting the current supplied. That is, various voltages may be applied to the terminals 65 and 66 depending upon the desired heating effects. The desired uniformity of heating at various points along the line of cleavage may be obtained by properly spacing the perpendicular lengths of resistance wire 63. It may also be found desirable to vary the temperature of the hot wire 41 as by adjusting the voltage of the source of current supply.

The supporting member 78 may be mounted upon or formed integrally with a vertically slidable member 81 received between guide strips 82 and 83. The conveyor roller operating levers 34 may be pivotally and slidably connected as at 84 to the member 81. An operating lever 85 may be pivotally mounted upon a rock shaft 86 and pivotally and slidably connected at 87 to the slidable member 81. The lever 85 may be extended to an accessible location to provide a foot pedal 88. When the foot pedal 88 is depressed, the slidable member 81 together with the hot wire 41 and the heating plates 48 and 49 are elevated within the gap 40 in the table and into close proximity of the under side of the glass which is to be severed. Simultaneously by reason of the operating levers 34, the slidable members 31, together with the conveyor rollers, are lowered out of supporting relation with the glass to bring the glass into contact with the anti-friction supporting devices 39.

The rock shaft 86 may extend from the table supporting frame 23 to the supporting frame 22. It will be understood that the supporting frame 22 may be provided with operating levers and slidable supporting means for the conveyor rollers, the heating plates and the hot wire, similar to the arrangement mounted upon the frame member 23 and operated by the rock shaft 86. The slidable members 31 at their upper ends may be provided with a horizontally extending bar as at 89 extending the length of the table for interconnecting the slidable members 31 at each of the frames 22 and 23. The supporting member 78 if desired may likewise be extended for interconnecting the slidable members 81. The frame members 22 and 23 may be retained in proper relationship by connecting rods as at 90.

In order to form the desired fault or nick at the line of cleavage, means may be provided for this purpose for engaging the glass either at its upper edge or its lower edge, at the time the glass is moved into cutting position upon the table. For example, as indicated in Fig. 4, a hardened steel cutting wheel 91 may be pivotally mounted in a slidable bearing 92 which bearing is pressed downwardly by a spring 93 so as to bring the cutting wheel into firm but yielding contact with the edge of the glass at the desired line of cleavage when the glass is moved into cutting position. Contact with successive pieces of glass will cause the cutting wheel 91 to turn periodically to bring fresh cutting edge portions into operating position. The bearing 92 if desired may be supported upon a partition member 94 which retains the two severed portions of glass in spaced relation, as the same are moved off the table 20.

In operating the machine the heating plates and the hot wire are first adjusted to obtain the proper results with the particular kind of glass to be cut. The proper adjustments may be determined either by a cut-and-try method or by reference to prior experience with the machine. The glass to be cut is then brought into the desired position on the table and when properly positioned the nick or weakened portion is formed in the manner above described. When the operator applies pressure to the pedal 88, the heated elements are brought into active position and at the same time the conveyor rollers are lowered so that the glass rests upon the anti-friction supporting devices. Within a few seconds the glass severing action will start at the weakened portion and rapidly and accurately proceed along the desired line of cleavage. During the severing action, and also thereafter, the severed edges will rest upon the shoulder portions 44 and 45 and will be prevented from excessive sagging and from dropping through the gap in the table. At the same time by reason of the gap in the table the zone of cutting will be very effectively insulated from contact with heat conductive or absorptive objects.

When a heated wire is applied along a desired line of cleavage on an extended area of glass and no particular provision is made for controlling the distribution of heat along the zone of such line, the severing action if it occurs, will not be under the operator's control and will not ordinarily follow the desired line. By providing heating plates as above described, however, the heat radiation within and along the glass may be readily controlled and the areas of glass each side of the cutting line may be heated substantially equally when it is desired to split an extended area of glass through its mid portion. Additional problems arise however, when it is desired to trim a narrow strip from the edge of an extended area of glass or when it is desired to split a narrow strip of glass. Because of the conditions prevailing at the edge of a large area of glass, we have found it usually necessary to provide but one heating plate positioned at the side of the cutting wire opposite from the edge. Considerable care must be exercised in selecting a proper form and position for such single heating plate. If an excess of heat is applied, the glass in most cases will not be severed along the desired line of cleavage and along the heated cutting wire. Instead a more or less irregular cracking will occur usually following a curved line at the side of the cutting wire opposite from the edge. If insufficient heat is applied, the glass will usually be severed along a more or less irregular line, generally curved outwardly in respect to the hot wire on the sheet of glass. In each of these instances it will be noted that the line of expansion where breaking occurs does not extend along the hot cutting wire, but apparently follows approximately the center of the field or zone of expansion. When an intermediate proper temperature is applied with a suitable heating plate, the line of severing will follow accurately the hot wire at the desired line of cleavage.

Figure 7:
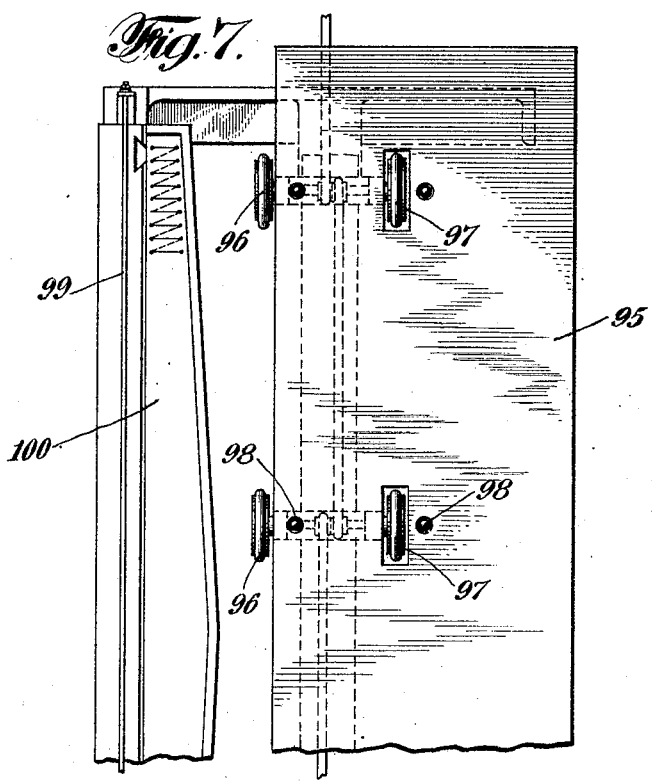
Fig. 7 is a plan view of part of the machine shown in Fig. 6.

In Figs. 6 and 7 a machine designed particularly for trimming the edges of glass is illustrated. A table 95 is provided for supporting the glass and may be equipped with conveyor rollers as at 96 and 97 and anti-friction supporting devices as at 98 similar to the corresponding parts in the machine above described. A heated wire is indicated at 99 and may be accompanied by a single heating plate 100. The wire 99 and the heating plate 100 may be provided with adjustable and vertically movable supporting means constructed in substantially the same manner as in the machine above described, but omitting one of the heating plates and accompanying parts. As indicated in Fig. 6, the heating plate 100 may be laterally and independently adjusted by a thumb screw 101 and vertically adjusted by a thumb screw 102. The heating plate, together with the hot wire 99, may be adjusted laterally as a unit by the thumb screw 103. The heating elements may be raised and lowered by operating a foot pedal 104 with the associated connecting members similar in construction to the foot pedal 88 and its associated parts above described. The parts which are not herein specifically described in connection with the machine of Figs. 6 and 7 may be constructed substantially according to the corresponding parts of the machine shown in Figs. 1–5.

A process in which this apparatus may be utilized is described and claimed in our copending application Ser. No. 151,225, filed November 27th, 1926, and entitled "Process of severing glass or the like."

While we have described our invention in considerable detail with respect to the preferred forms of apparatus embodying the same, it will be understood by those skilled in the art after understanding our invention, that various changes and modifications may be made without departing from the spirit and scope of the invention and we aim in the appended claims to cover all such modifications and changes as come within the spirit of the invention.

What we claim as new and desire to secure by Letters Patent of the United States is:

1. A device for cutting glass comprising a supporting surface therefor, a gap being provided in said surface along the zone of cutting, and means extending along said zone for applying a high temperature to the desired line of cleavage of the glass.

2. A device for cutting glass comprising a supporting surface therefor, a gap being provided in said surface along the zone of cutting, and means extending along said zone for applying a high temperature to the desired line of cleavage of the glass, and further means for applying a lesser temperature to the remainder of said zone.

3. A device for cutting glass comprising a supporting table therefor, a gap being provided in the table along the zone of cutting, and means movable into and out of proximity of the glass and extending along said zone for applying a high temperature to the desired line of cleavage of the glass.

4. A device for cutting glass comprising means for establishing a heated zone extending each side of the line of cleavage, said zone being narrower at the glass edges than at other points along the line of cleavage, and means for applying a higher temperature to the line of cleavage.

5. A glass severing machine comprising a plurality of spaced supports for the glass, and means movable into and out of proximity of the under side of the glass between said supports for applying a high temperature to the desired line of cleavage of the glass and for simultaneously heating to a lesser temperature the areas at each side of said line.

6. A glass severing machine comprising a plurality of spaced supports for the glass provided with antifriction means for engagement with the glass to permit unstrained separation of the glass parts when being severed, and means for applying a high temperature to the desired line of cleavage of the glass and for simultaneously heating to a lesser temperature the areas adjacent said line whereby controlled cutting occurs at said line.

7. A glass cutting machine comprising means for supporting the glass, an electrically heated resistance wire, supporting means for said wire including a strip of insulating material having a longitudinal groove for receiving the wire, heating plates fixed at each side of said strip in parallel spaced relation to the glass for establishing a heated zone in the glass along the desired line of cleavage, and a movable supporting frame for raising and lowering said insulation strip and heating plates into and out of proximity of the glass.

8. A glass cutting machine comprising a table for supporting the glass horizontally, an electrically heated resistance wire, supporting means for said wire, heating plates fixed at each side of said supporting means in parallel spaced relation to the glass for establishing a heated zone in the glass along the desired line of cleavage, a gap being provided in the table along said zone, and a movable supporting frame for raising and lowering said wire supporting means and heating plates into and out of proximity of the under side of the glass within said gap in the table.

9. A glass severing machine comprising a means for supporting the glass, an electrically heated resistance wire, supporting means for said wire including a strip of insulating material having a longitudinal groove for receiving the wire and shoulder portions at each side of said groove for supporting the severed glass edges.

10. A glass severing machine comprising a table for supporting the glass, an electrically heated resistance wire, supporting means therefor, heating plates at each side of said wire in parallel spaced relation to the glass for establishing a heated zone in the glass along the desired line of cleavage, and a vertically movable supporting frame for raising or lowering said heating plates into or out of proximity of the glass.

11. A glass cutting machine comprising a table for supporting the glass horizontally, an electrically heated resistance wire, supporting means for said wire having shoulder portions at each side thereof for supporting the severed glass edges, heating plates positioned at each side of said strip in parallel spaced relation to the glass for establishing a heated zone in the glass along the desired line of cleavage, the width of said zone at points spaced from the edges of the glass being greater than near the glass edges at the ends of the line, and a movable supporting frame for moving said wire supporting means into or out of proximity of the glass at the desired line of cleavage.

12. A glass cutting machine comprising a table for supporting the glass, an electrically heated resistance wire, supporting means for said wire having shoulder portions at each side thereof for supporting the severed glass edges, heating plates fixed at each side of said supporting means in parallel spaced relation to the glass, said heating plates being made up of spaced electrically heated wires extending substantially perpendicular to said first named wire for establishing a heated zone in the glass along the desired line of cleavage, the length of said spaced wires being greater at points spaced from the edges of the glass to thereby form a heated zone wider at such points than near the edges, and a movable supporting frame for carrying said wire supporting means and heating plates into and out of proximity of the desired line of cleavage.

13. A glass cutting machine comprising a table for supporting the glass, an electrically heated resistance wire, supporting means for said wire including a strip of insulating material having a longitudinal groove for receiving the wire and shoulder portions at each side of said groove for supporting the severed glass edges, heatng plates fixed at each side of said strip in parallel spaced relation to the glass, said heating plates being made up of spaced electrically heated wires extending substantially perpendicular to said first named wire for establishing a heated zone in the glass along the desired line of cleavage, the length of said spaced wires being greater at points spaced from the edges of the glass to thereby form a heated zone wider at such points than near the edges, a gap being provided in the table along said zone, and a vertically movable supporting frame for raising and and lowering said insulation strip and heating plates into and out of proximity of the glass within said gap in the table.

14. Mechanism for cutting glass comprising a table therefor provided with a plurality of conveyor rollers, an electrically heated resistance wire, heating plates at each side of said wire for establishing a heated zone in the glass along the line of cleavage, vertically movable supporting means for said wire and plates, vertically movable supporting means for said rollers, and means operable to simultaneously elevate said first named supporting means with said wire and heating plates into proximity of the glass while said second named supporting means and said rollers are being lowered for removing the rollers from contact with the glass.

15. Mechanism for cutting glass comprising a table therefor provided with a plurality of conveyor rollers, an electrically heated resistance wire, movable supporting means for said wire, movable supporting means for said rollers, and means operable to move said first named supporting means with said wire into proximity of the glass and to displace said second named supporting means and said rollers to remove the rollers from supporting relation with the glass.

16. Mechanism for cutting glass comprising a receiving frame therefor provided with a plurality of conveyor members, an electrically heated resistance wire, movable supporting means for said wire, vertically movable supporting means for said conveyor members, and means operable to simultaneously move said first named supporting means with said wire into proximity of the glass while said second named supporting means and said conveyor members are being lowered for removing the latter from contact with the glass.

17. Mechanism for cutting glass comprising a receiving frame therefor provided with a plurality of conveyor rollers, an electrically heated resistance wire, heating plates at each side of said wire for establishing a heated zone in the glass along the line of cleavage, movable supporting means for said wire and plates, movable supporting means for said rollers, and means operable to move said first named supporting means with said wire and heating plates into proximity of the glass while said second named supporting means and said rollers are moved to bring the rollers out of supporting relation with the glass.

18. Mechanism for cutting glass comprising a receiving frame therefor provided with a plurality of conveyor members, an electrically heated resistance wire, movable supporting means for said wire, movable supporting means for said conveyor members, and means operable to move said first named supporting means with said wire into proximity of the glass while said second named supporting means and said conveyor members are moved to bring the conveyor members out of contact with the glass.

19. Mechanism for cutting glass comprising a receiving frame therefor provided with a plurality of conveyor members, an electrically heated resistance wire, heating plates at each side of said wire for establishing a heated zone in the glass along the line of cleavage, movable supporting means for said plates, movable supporting means for said rollers, and means operable to move said first named supporting means with said heating plates into proximity of the glass and to move said second named supporting means and said conveyor members in a direction to bring the conveyor members out of contact with the glass.

20. A device for cutting glass comprising means extending along the zone of cutting for applying a high temperature to the line of cleavage of the glass, and means for heating to a lesser temperature but substantially equally the areas at each side of said line.

21. A glass cutting device comprising a heated element, and means for supporting said element when heated along the desired line of cleavage but spaced slightly therefrom.

22. A device for cutting hardened glass along a predetermined desired line comprising means for establishing a heated zone on the glass and also heating means for splitting the glass at said line of cleavage within said zone.

23. Mechanism for cutting glass comprising a supporting table therefor provided with a plurality of conveyor rollers, an electrically heated resistance wire, supporting means for said wire, and vertically movable supporting means for said rollers operable to lower the rollers, bringing the glass toward said wire.

24. A glass severing device comprising means for supporting the glass provided with anti-friction conveyor means receiving the glass, means for forming a weak spot in the edge of the glass at the desired line of cleavage when the glass is moved into position upon said supporting means, an electrically heated wire, and means for supporting said wire along said line of cleavage and with a portion contacting with the glass at a point adjacent the weak spot.

25. A glass severing device comprising means for supporting the glass, cutting means for forming a nick in the glass at the desired line of cleavage, an electrically heated wire, and means for supporting said wire along said line of cleavage and with a heated portion extending into contact with the glass at a point adjacent the nick.

26. A glass severing device comprising means for supporting the glass, means for forming a nick in the edge of the glass at the desired line of cleavage when the glass is placed in position upon said supporting means, an electrically heated wire, and means for supporting said wire along said line of cleavage but spaced slightly therefrom, the wire being formed with a heated portion extending into contact with the glass at a point adjacent the nick.

27. A glass severing device comprising means for supporting the glass, cutting means for forming a nick in the glass at the desired line of cleavage when the glass is placed in position upon said supporting means, an electrically heated wire, means for supporting said wire along said line of cleavage but spaced slightly therefrom, the wire being formed with a heated portion extending into contact with the glass at a point adjacent the nick, and heating plates fixed at each side of said wire in parallel spaced relation to the glass.

28. A glass severing device comprising means for supporting the glass, means for forming a nick in the edge of the glass at the desired line of cleavage when the glass is placed in position upon said supporting means, an electrically heated wire, and means for supporting said wire when heated, along said line of cleavage.

29. A glass cutting device comprising means for supporting the glass, a heated wire, and means for supporting said wire under tension when heated along the desired line of cleavage but spaced slightly therefrom, the wire also being formed with a heated portion extending into contact with the glass.

30. A glass cutting device comprising means for supporting the glass provided with anti-friction means for engagement with the glass to permit unrestrained separation of the glass parts when being severed, cutting means for forming a nick in the edge of the glass at the desired line of cleavage when the glass is placed in position upon said supporting means, a heated object, means for supporting said object when heated along said line of cleavage but spaced slightly therefrom, the wire being formed with a heated portion extending into contact with the glass at a point adjacent the nick, and heating plates positioned at each side of said wire in parallel spaced relation to the glass.

31. A device for cutting glass comprising means extending along the desired line of cleavage for heating the glass at said line, and a heating plate for heating the glass along a zone including said line.

32. A device for cutting glass comprising means extending along the desired line of cleavage for heating the glass at said line, and heating plate means for heating the glass along a zone extending to both sides of said line.

33. A device for cutting glass comprising means extending along a desired line of cutting for heating the glass at said line, and additional means for heating substantially uniformly a zone on the glass contiguous to said line.

34. A device for cutting glass along a predetermined desired line, comprising a pair of heating members extending respectively at each side of the plane of severing, and additional means cooperating therewith for cracking the glass at said line.

In testimony whereof we have signed our names to this specification.

FURMAN N. CAMPBELL.
JULES MYATT.